July 21, 1953 — F. H. H. FOSS — 2,646,306
LIFTING HOOK
Filed Dec. 28, 1950
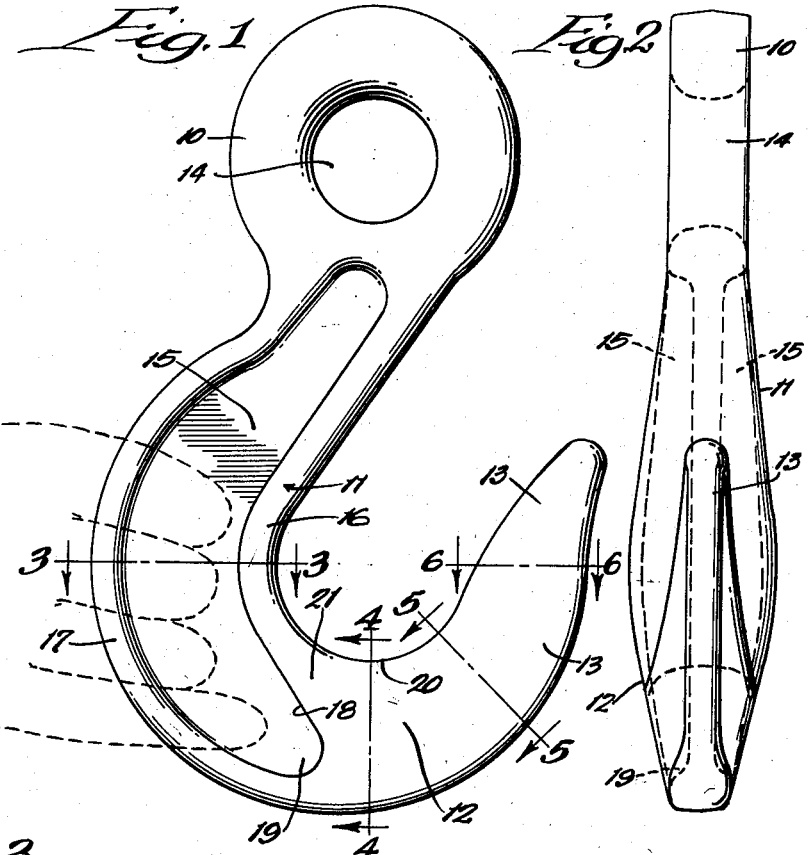
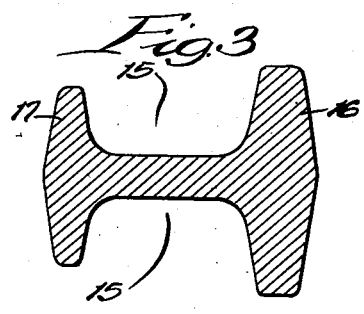
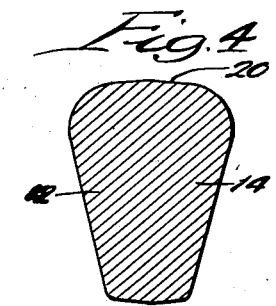
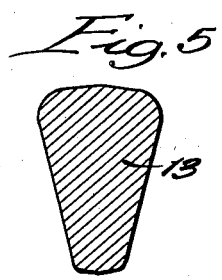
INVENTOR:
Ferdinand H. H. Foss,
BY
Dawson & Ons,
ATTORNEYS.

Patented July 21, 1953

2,646,306

UNITED STATES PATENT OFFICE 2,646,306

LIFTING HOOK

Ferdinand H. H. Foss, Chicago, Ill., assignor to S. G. Taylor Chain Company, Hammond, Ind., a corporation of Illinois Application December 28, 1950, Serial No. 203,062

1 Claim. (Cl. 294—82)

This invention relates to a lifting hook and of the type commonly referred to as a sling hook or chain hook.

It is well known that a chain hook or sling hook, which is employed in hoisting heavy loads, is subjected to severe strains and considerable wear, and that the workman handling the hook and bringing it under the load is subjected to hazards and particularly to the danger of injuring his hand should the load slip slightly as it is being engaged by the hook and as the chain is being tightened so as to cause the hook to engage the load. Another matter which has caused grave concern in the operation of such hooks is that there is usually no warning given where the load is too heavy for the hook and straightening out of the hook occurs. A large proportion of the accidents occur when the hook first engages the load and the hoisting operation is just beginning. A further consideration is that the hook should be made as light as possible to facilitate its being handled by the workman in setting the hook for engagement with the load.

An object of the present invention is to provide a hook which is relatively light and easy to handle while at the same time providing means which guide the hands of the operator away from the load-engaging portion of the hook while at the same time providing a load-engaging portion or point portion which, in the case of an excessive load, tends to form a telltale bend and thus warns the operator before an accident occurs. A further object is to provide a lifting hook structure having a relatively solid lifting portion and point portion of a hardness less than that of the shank portion of the hook so that in the event of an excessive load for the hook, such portions visibly distort as a warning before a fracture of the hook occurs, while also providing in the shank portion a lighter weight structure in which guide channels direct the fingers of the operator away from the load-engaging surfaces. Yet another object is to provide a hook of shorter and more compact arrangement providing a load-engaging portion which better resists crushing and twisting, while at the same time providing a hook of relatively light weight. Other specific objects and advantages will appear as the specification proceeds.

The invention is shown, in an illustrative embodiment, by the accompanying drawing, in which—

Figure 1 is a side view in elevation of a hook embodying my invention; Fig. 2, a front view in elevation; Fig. 3, a sectional view, the section being taken as indicated at line 3—3 of Fig. 1; Fig. 4, a sectional view, the section beink taken at line 4—4 of Fig. 1; Fig. 5, a sectional view, the section being taken at line 5—5 of Fig. 1; and Fig. 6, a transverse sectional view of the point portion, the section being taken as indicated at line 6—6 of Fig. 1.

In the illustration given, the hook shown is provided with an upper apertured end portion 10, a generally vertical shank portion 11, a load-engaging and laterally-extending portion 12, and an upwardly-extending point portion or point 13. The upper portion is provided with the usual aperture 14 for receiving a chain link or wire rope thimble, etc. It will be understood that the form of this portion of the hook may be modified as desired.

The load-engaging portion, which is indicated generally by the numeral 12 and which is shown in cross-section in Fig. 4, extends laterally from the shank portion 11 and is substantially solid in cross-section. Also, the upwardly-extending point portion 13 is also solid in cross-section, as indicated in Figs. 5 and 6. Thus the saddle portion or load-engaging portion and the point constitute a substantially solid body which because of its depth does not respond to give as great hardness when heat treated as the channeled shank portion 11, which will now be described.

The shank portion 11, which is generally vertical in the structure shown, has channels 15 formed on either side thereof. This gives a generally H-shaped structure, as shown more clearly in Fig. 3. The larger side 16 of the H-shaped structure faces the inner portion of the hook and the load-engaging surface, while the outer leg 17 of the H provides a grip for the operator, as illustrated in dotted lines in Fig. 1.

The channel 15 is wider about its central portion in the vertical plane and tapers at each end.

The channels 15 as they approach the load-engaging portion 12, are directed rather sharply downwardly along the line 18, as shown best in Fig. 1, and terminate in a pocket 19 at a point toward the bottom portion of the hook and well away from the load-engaging surface 20 of the area 12. Thus it will be seen that the downwardly-extending pocket portion 18 serves as a guard for directing the fingers of the operator away from the load-engaging surface and keeping them well down toward the bottom of he hook and rearwardly of the load-engaging area 12. Further, by directing the channels 15 sharply downwardly along line 18, there is provided a wide enlarging throat portion 21 above the pocket 19 so that the portion 16 of the shank 11 enlarges as it merges with the solid body portion 12.

*Operation*

In the operation of the hook structure, the operator grasps the handle portion 17 of the shank 11 so that the fingers and thumb of the operator are both housed within the channels 15 and with the downwardly-inclined pocket portion 19 of the channels keeping the fingers of the operator to the rear of and well below the load-engaging surface 20. The operator can readily lift the hook, which is considerably lightened by the channel portions 15, and place it under a chain or other surface which is to be engaged by the hook, holding the hook safely until the hoisting chain or lifting element is tightened. In this critical moment when the chain is being tightened and the load is being engaged, should the load be excessive for the hook, the solid portion of the hook which includes the portions 12 and 13 tends to visibly distort, and this gives a warning to the operator that the load is excessive. It will be understood that in the heat treating of the hook, the channeled shank portion 11, by reason of its relative thinness, acquires considerably greater hardness than the solid portions 12 and 13. The solid portions 12 and 13, because of their thickness remain somewhat softer than the shank portion, and thus will bend before a fracture would occur in the shank portion 11.

Often injury is caused due to point loading, that is, causing the point portion of the hook to engage the load rather than the central saddle portion 20. Should this occur, the solid point will tend to yield if the load is excessive for the point, and thus will provide a warning to the operator before any breaking of the hook occurs.

From the foregoing, it will appear that a light hook is provided which can be readily handled by the operator, while at the same time the channeled vertical portion provides a shielded gripping handle for the operator and a pocket which prevents the slipping of the hand into the danger zone, the pocket not only directing the fingers downwardly and away from the load-engaging surface 20 as the channel approaches the portion 12, but also this structure provides a widening or enlarging throat 21 of solid cross-section between the load-engaging portion 12 and the forward portion 16 of the shank 11. The load-engaging portion 12 is resistant to wear and its solid cross-section prevents crushing of the hook at this area while, in the event of point loading or excessive loading, a telltale bending occurs prior to any breakage of the hook, and such bending further occurs at a point where no damage is done and before an accident occurs.

While, in the foregoing specification, I have set out a single structure in considerable detail for the purpose of illustrating one embodiment of the invention, it will be understood that such details of structure may be varied widely by those skilled in the art without departing from the spirit of my invention.

I claim:

A lifting hook, having an upper apertured end, a generally vertical shank portion, a laterally-extending load-engaging portion, and an upwardly-inclined point, said point and load-engaging portion being substantially solid in cross-section and said shank portion being longitudinally recessed centrally on both sides to form a structure which is substantially H-shaped in cross-section and which tapers generally from the front thereof toward the rear, the channels on both sides having substantially straight side walls and extending downwardly toward the bottom of the hook and terminating in a pocket pointed downwardly toward the bottom of the hook and in a direction away from the upper surface of the load-engaging portion, said downwardly-directed pocket of each of said channels being spaced from the upper surface of the load-engaging portion by a solid throat which widens progressively as it approaches said point portion of the hook.

FERDINAND H. H. FOSS.

References Cited in the file of this patent

UNITED STATES PATENTS

| Number | Name | Date |
| --- | --- | --- |
| 336,687 | Barr | Feb. 23, 1886 |
| 1,459,816 | Bemis | June 26, 1923 |
| 1,498,691 | Kearns | June 24, 1924 |
| 1,956,786 | Bemis | May 1, 1934 |